United States Patent
Chen et al.

(10) Patent No.: US 7,367,290 B2
(45) Date of Patent: May 6, 2008

(54) DIESEL COMBUSTION MODE SWITCHING CONTROL STRATEGY AND MODEL

(75) Inventors: Qian Chen, Rochester, MI (US); Charles H. Folkerts, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/466,902

(22) Filed: Aug. 24, 2006

(65) Prior Publication Data

US 2008/0047523 A1 Feb. 28, 2008

(51) Int. Cl.
  *F02B 3/06* (2006.01)
(52) U.S. Cl. ..................... 123/27 R; 123/294
(58) Field of Classification Search ............ 123/27 R, 123/294, 295, 299, 435
See application file for complete search history.

(56) References Cited

U.S. PATENT DOCUMENTS

| | | | | |
|---|---|---|---|---|
| 5,875,743 | A * | 3/1999 | Dickey | 123/25 C |
| 6,684,849 | B2 * | 2/2004 | zur Loye et al. | 123/295 |
| 6,807,937 | B2 * | 10/2004 | Gianolio et al. | 123/308 |
| 6,915,776 | B2 | 7/2005 | zur Loye et al. | 123/304 |

* cited by examiner

*Primary Examiner*—T. M Argenbright

(57) ABSTRACT

A combustion mode switching control system for diesel engines is provided. The system includes: a switch determination module that initiates a switch request to switch between at least one of a premixed compression ignition (PCI) mode and a diesel combustion mode based on engine speed and at least one of fuel quantity and torque; a transition module that commands the at least one of the PCI mode and the diesel combustion mode based on the switch request; and a control module that controls at least one of target airflow, desired fuel quantity, and desired fuel injection timing based on the command.

19 Claims, 7 Drawing Sheets

DIESEL COMBUSTION MODE SWITCHING CONTROL STRATEGY AND MODEL

FIELD OF THE INVENTION

The present disclosure relates to methods and systems for controlling fuel injection of a diesel combustion engine.

BACKGROUND OF THE INVENTION

The statements in this section merely provide background information related to the present disclosure and may not constitute prior art.

Traditionally, there have been two primary forms of reciprocating piston or rotary internal combustion engines: diesel and spark ignition engines. While these engine types have similar architecture and mechanical workings, each has distinct operating properties. For example, to initiate combustion, spark ignition engines supply an air/fuel mixture to the engine cylinder while controlling spark timing. In contrast, diesel engines compress air in the cylinder while controlling fuel injection timing to initiate the start of combustion.

One of the major advantages that the diesel engine has over the pre-mixed charge spark-ignited engine is higher thermal efficiency. This is generally due to the higher compression ratio and leaner combustion operation provided by the diesel engine. One trade-off to the higher thermal efficiency of the diesel engine is that it is more difficult or expensive to achieve the same tailpipe $NO_x$ emission levels as does the spark-ignited engines. This is due to the lean air/fuel control nature of the diesel engine.

Premixed Compression Ignition (PCI) is an advanced diesel combustion technique that has great potential for reducing diesel engine emissions. With PCI, fuel is injected into the combustion chamber of the cylinder much earlier in the combustion stroke than would be done for diesel combustion. The desired fuel amount is supplied significantly before the piston reaches the compression top dead center (TDC). The early injected fuel is mixed sufficiently with the air before the piston reaches the compression TDC. Thus, the technique provides a lean and well mixed state of the air/fuel mixture before ignition.

However, PCI combustion is limited to low-load operating conditions. Therefore, during other operating conditions diesel combustion is required. Because PCI combustion and diesel combustion have different requirements for the exhaust gas recirculation (EGR) percentage, the air/fuel ratio, and the fuel injection timing, the problem of how to switch smoothly between these two combustion modes becomes a concern. Excessive smoke, $NO_x$, and combustion noise will result from lack of effective combustion mode switching control.

SUMMARY OF THE INVENTION

Accordingly, a combustion mode switching control system for diesel engines is provided. The system includes a switch determination module that initiates a switch request to switch between at least one of a premixed compression ignition (PCI) mode and a diesel combustion mode based on engine speed and at least one of fuel quantity and torque. A transition module commands at least one of the PCI mode and the diesel combustion mode based on the switch request. A control module controls at least one of target airflow, desired fuel quantity, and desired fuel injection timing based on the command.

In other features, a method of switching between a premixed compression ignition mode (PCI) and a diesel combustion mode for diesel engines is provided. The method includes: initiating a switch request to switch between at least one of a premixed compression ignition (PCI) mode and a diesel combustion mode based on engine speed and at least one of fuel quantity and torque; commanding at least one of the PCI mode and the diesel combustion mode based on the switch request; and controlling at least one of target airflow, desired fuel quantity, and desired fuel injection timing based on the commanded mode.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE PREFERRED EMBODIMENTS

Figure 1:
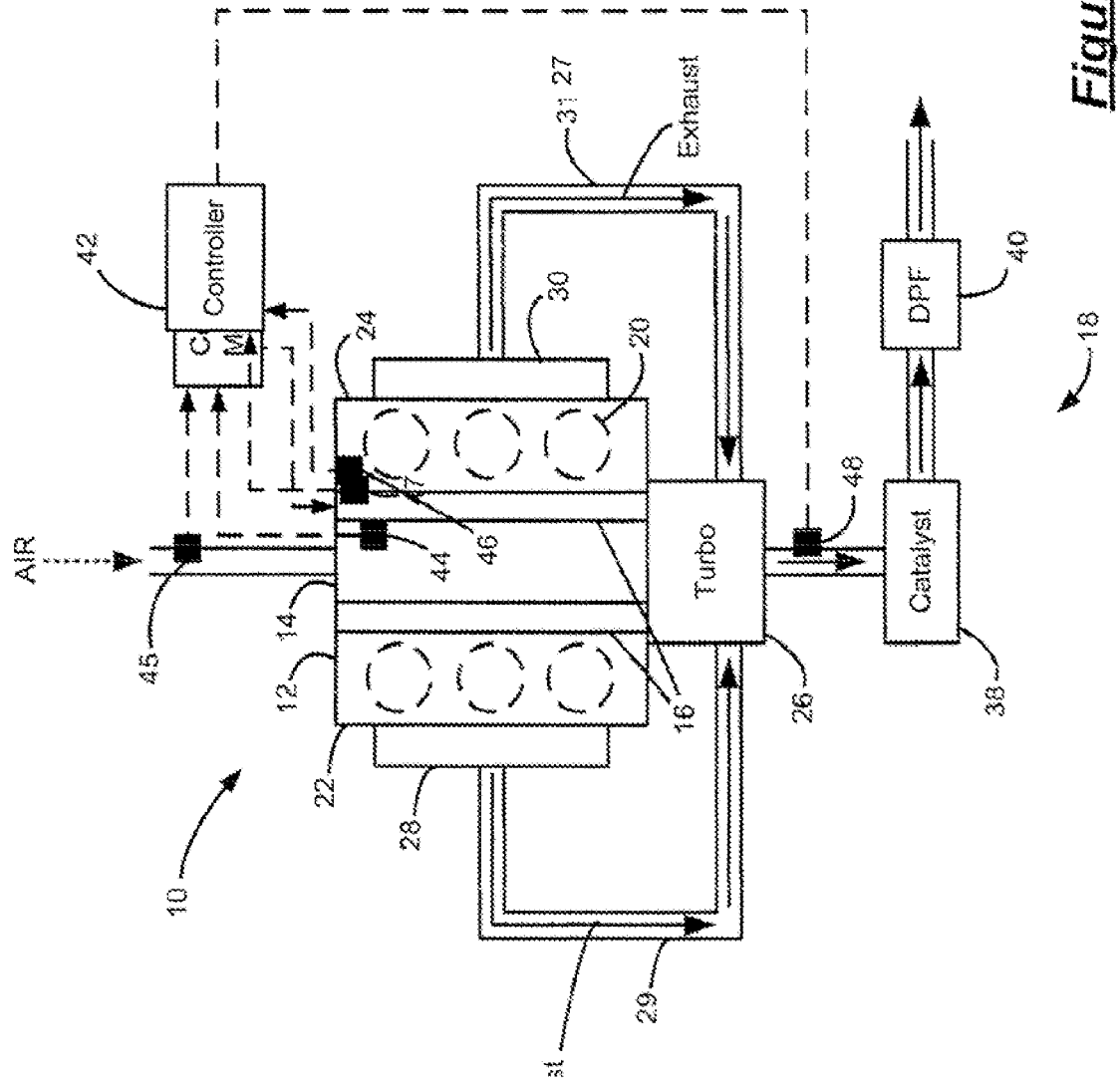
FIG. 1 is a functional block diagram of a diesel engine.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, an exemplary diesel engine system 10 is schematically illustrated. It is appreciated that the diesel engine system 10 is merely exemplary in nature and that the diesel combustion mode switching control strategy described herein can be implemented in various diesel engine systems. The diesel engine system 10 includes a diesel engine 12, an intake manifold 14, a common rail fuel injection system 16 and an exhaust system 18. The exemplary engine 12 includes six cylinders 20 configured in adjacent cylinder banks 22,24 in V-type layout. Although FIG. 1 depicts six cylinders (N=6), it can be appreciated that the engine 12 may include additional or fewer cylinders 20. For example, engines having 2, 4, 5, 8, 10, 12 and 16 cylinders are contemplated.

Figure 2:
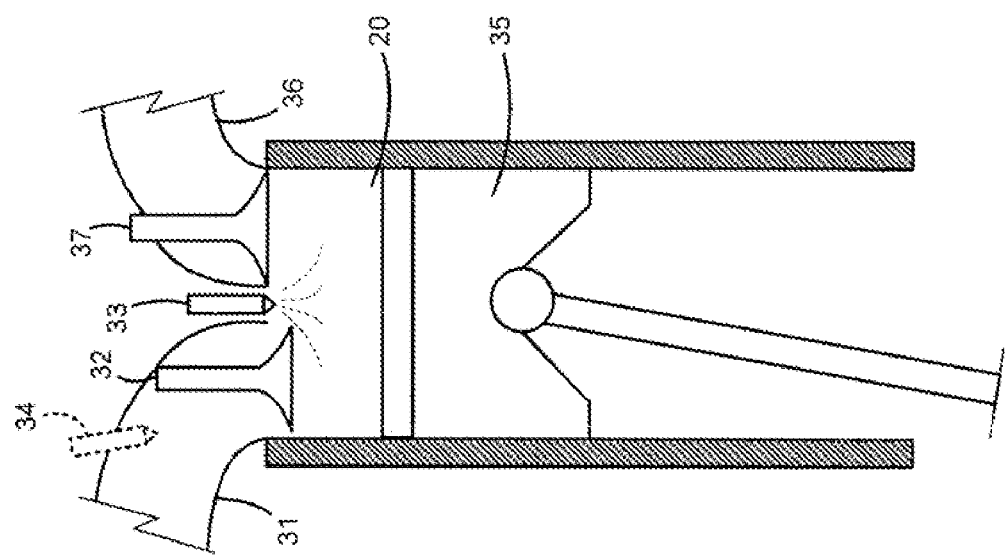
FIG. 2 is a cross-sectional view of a cylinder of a diesel engine.

Air is drawn into the intake manifold 14, is distributed to the cylinders 20 and is compressed therein. FIG. 2 illustrates a cylinder 20 in more detail. Fuel is injected into an intake port 31 of the cylinder 20 and/or directly into the cylinder 20 by the common rail injection system 16 (FIG. 1). The heat of the compressed air ignites the air/fuel mixture. An intake valve 32 selectively opens and closes to enable the air to enter the cylinder 20. The intake valve position is regulated by an intake camshaft (not shown). A fuel injector 33 injects fuel into the cylinder 20. The fuel injector 33 is controlled to provide a desired air-to-fuel (A/F) ratio within the cylinder 20 at a time and quantity determined by the diesel combustion mode switching control strategy. An additional fuel injector shown in phantom at 34 may be provided at or near the intake port 31 of the cylinder 20 and may be similarly controlled according to the diesel combustion mode switching control strategy.

A piston 35 compresses the A/F mixture within the cylinder 20. The compression of the hot air ignites the fuel in the cylinder 20, which drives the piston 35. The piston 35, in turn, drives a crankshaft (not shown) to produce drive torque. Combustion exhaust within the cylinder 20 is forced out an exhaust port 36 when an exhaust valve 37 is in an open position. The exhaust valve position is regulated by an exhaust camshaft (not shown). Although single intake and exhaust valves 32,37 are illustrated, it can be appreciated that the engine 12 can include multiple intake and exhaust valves 32,37 per cylinder 20.

Referring back to FIG. 1, the exhaust gases are exhausted from the cylinders 20 and into the exhaust system 18. The exhaust system 18 includes exhaust manifolds 28,30, exhaust conduits 27,29 a catalyst 38, and a diesel particulate filter (DPF) 40. First and second exhaust segments are defined by the first and second cylinder banks 22,24. The exhaust manifolds 28,30 direct the exhaust segments from the corresponding cylinder banks 22,24 into the exhaust conduits 27,29. In some instances, the diesel engine system 10 can include a turbo 26 that pumps additional air into the cylinders 20 for combustion with the fuel and air drawn in from the intake manifold 14. The exhaust is directed into the turbo 26 to drive the turbo 26. A combined exhaust stream flows from the turbo 26 through the catalyst 38 and the DPF 40. The DPF 40 filters particulates from the combined exhaust stream as it flows to the atmosphere.

Referring back to FIG. 1, the exhaust gases are exhausted from the cylinders 20 and into the exhaust system 18. The exhaust system 18 includes exhaust manifolds 28,30, exhaust conduits 27,29 a catalyst 38, and a diesel particulate filter (DPF) 40. First and second exhaust segments are defined by the first and second cylinder banks 22,24. The exhaust manifolds 28,30 direct the exhaust segments from the corresponding cylinder banks 22,24 into the exhaust conduits 27,29. In some instances, the diesel engine system 10 can include a turbo 26 that pumps additional air into the cylinders 20 for combustion with the fuel and air drawn in from the intake manifold 14. The exhaust is directed into the turbo 26 to drive the turbo 26. A combined exhaust stream flows from the turbo 26 through the catalyst 38 and the DPF 40. The DPF 40 filters particulates from the combined exhaust stream as it flows to the atmosphere.

A controller 42 regulates operation of the diesel engine system 10 according to the diesel combustion mode switching control strategy of the present disclosure. More particularly, the controller 42 determines if a switching between PCI and conventional diesel combustion is desired and controls the engine to switch between the combustion modes accordingly. The controller 42 communicates with an intake manifold boost pressure (boost) sensor 44, a mass airflow (MAF) sensor 45, an engine speed sensor 46, and an intake manifold temperature sensor 47. The boost sensor 44 generates a signal indicating the air pressure within the intake manifold 14. The MAF sensor 45 generates a MAF signal based on the flow of air into the engine 12. The engine speed sensor 46 generates a signal indicating engine speed (RPM). The intake manifold temperature sensor 47 generates a temperature signal based on the temperature of air in the intake manifold 14. An exhaust pressure sensor 48 generates an exhaust pressure signal based on pressure of the exhaust flowing from the turbo 26.

Figure 3:
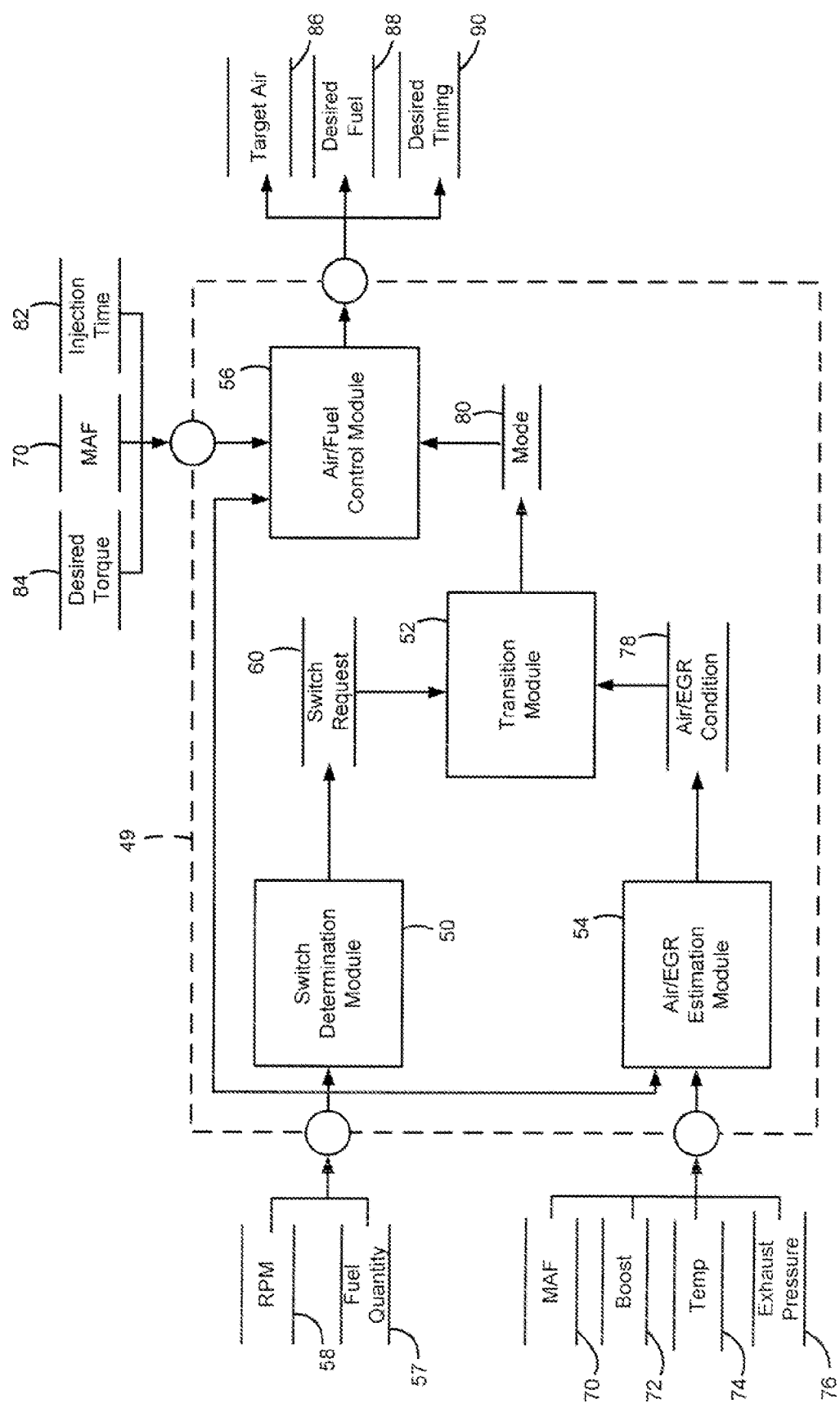
FIG. 3 is a dataflow diagram of a diesel combustion mode switching control system.

Referring now to FIG. 3, a dataflow diagram illustrates an embodiment of a diesel combustion mode switching control system 49 that may be embedded within the controller 42. Various embodiments of diesel combustion mode switching control systems 49 according to the present disclosure may include any number of sub-modules embedded within the controller 42. The sub-modules shown may be combined and/or further partitioned to similarly control the combustion mode. In various embodiments, the controller 42 of FIG. 3 includes a switch determination module 50, a transition module 52, an air/EGR estimation module 54, and an air/fuel control module 56.

The switch determination module 50 receives as input engine operating parameters such as engine speed 58 and an actual fuel quantity 57 (determined by other sub-modules within controller 42). The switch determination module 50 determines whether a transition between the PCI mode and the diesel combustion mode is desired based on the engine operating parameters. If a transition is desired, the switch determination module 50 outputs a switch request 60 to the transition module 52. The air/EGR estimation module 54 receives as input engine operating parameters such as engine speed 58, the actual fuel quantity 57, mass airflow 70, boost pressure in the intake manifold 72, temperature in the intake manifold 74, and exhaust pressure 76. The air/EGR estimation module 54 determines if the air/EGR requirement for the PCI or diesel combustion is met. The air/EGR requirement estimation module outputs an air/EGR condition 78 to the transition module 52.

The transition module 52 receives as input the switch request 60 and the air/EGR condition 78. The transition module 52 coordinates when and how to transition between the combustion modes based on the conditions of air (if going to diesel combustion) or EGR (if going to POI). Once the transition module 52 determines the proper mode to transition to, a desired mode 80 is output to the air/fuel control module 56. The air/fuel control module 56 receives as input the mode 80 and engine operating parameters such as engine speed 58, actual fuel quantity 57, mass airflow 70, actual injection time 82, and desired torque 84. The air/fuel control module 56 determines how to control transitions between modes and during operation in the PCI mode and the diesel combustion mode. More specifically, the air/fuel control module 56 controls the air target 86, fuel injection quantity 88, and the desired timing 90. The details of the diesel combustion mode switching control system 49 will be described in more detail below.

Figure 4:
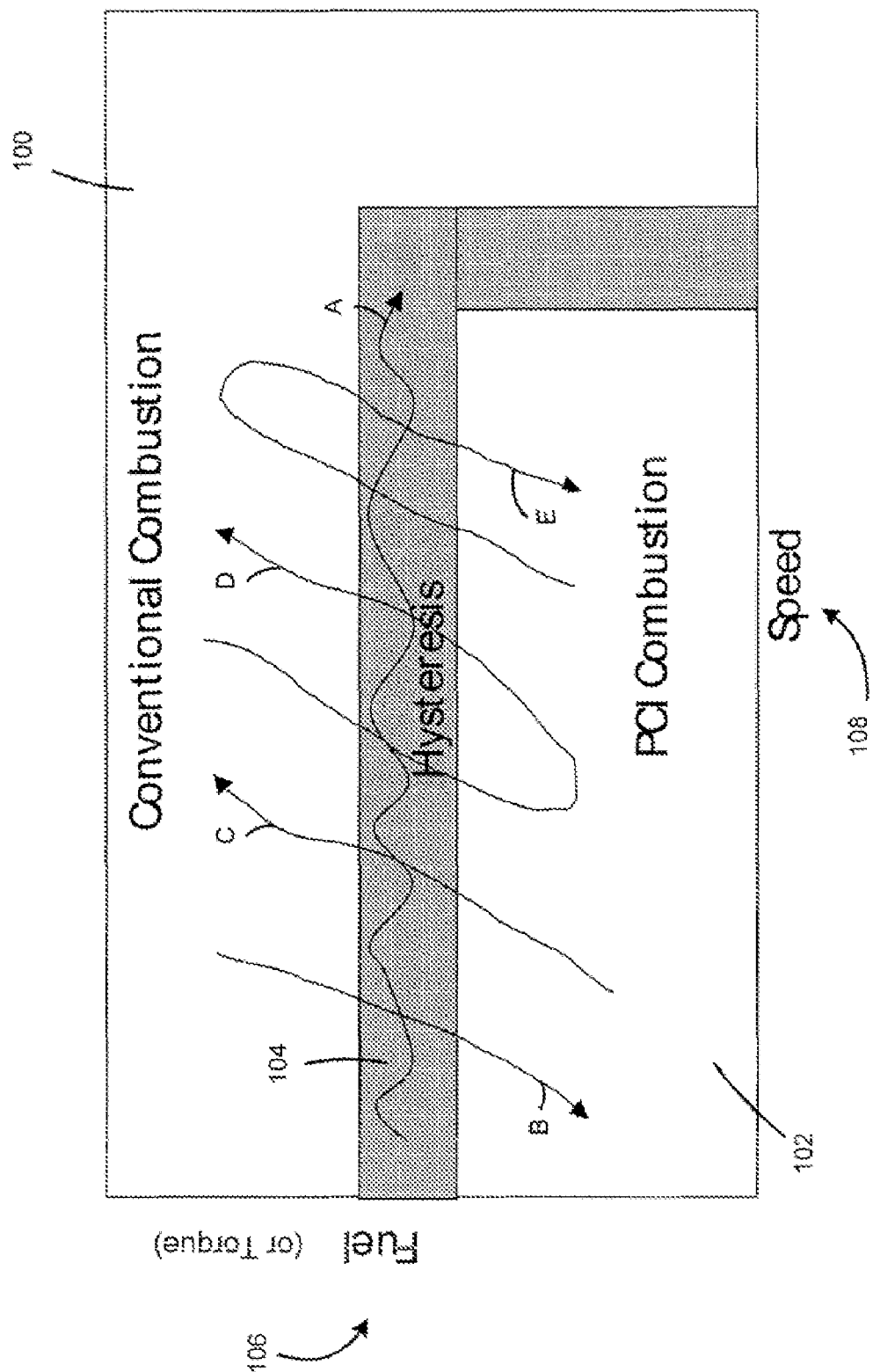
FIG. 4 is a diagram illustrating mode transitions.

Referring now to FIG. 4, the switch determination module 50 of FIG. 3 will be discussed in more detail. The switch determination module 50 determines if a switching between the PCI mode and the diesel combustion mode is desired. The strategy is designed to optimize the goals of minimizing the switching between the two combustion modes and maximizing the PCI combustion time to take advantage of the low emission levels of PCI combustion.

FIG. 4 depicts five engine operating point transition scenarios labeled A-E. Operating conditions of the engine are divided into three combustion modes: the diesel combustion mode 100, the PCI mode 102, and the hysteresis or transitional mode 104. The switch request 60 is determined based on fuel quantity shown along the y-axis at 106 and engine speed shown along the x-axis at 108. In an alternative embodiment, the switch request 60 is determined based on torque and engine speed. The strategy for determining the switch request 60 is based on the transition scenarios as described below.

Scenario A illustrates the fuel and speed requirements for when the combustion mode remains in the hysteresis area between the PCI and the diesel combustion modes (no switching occurs). Scenario B illustrates the fuel and speed requirements for when the combustion mode switches from the diesel combustion mode 100 to the PCI mode 102 and remains in the PCI mode 102 for some time. Scenario C illustrates the fuel and speed requirements for when the combustion mode switches from the PCI mode 102 to the diesel combustion mode 100 and remains in the diesel combustion mode 100 for some time.

Scenario D illustrates the fuel and speed requirements for when the combustion mode switches from the diesel combustion mode 100 to the PCI mode 102 then switches back to the diesel combustion mode 100 after only being in the PCI mode 102 for a short period of time. Upon determination of this scenario, the transition is actually limited to stay in the diesel combustion mode 100 for a certain delay period (no actual switching occurs). During this scenario, the switch request 60 is properly set to reflect this limitation. This prevents unnecessary switching back and forth to PCI combustion for only short periods of time.

Scenario E illustrates the fuel and speed requirements for when the combustion mode will switch from the PCI mode 102 to the diesel combustion mode 100 and then switch back to the PCI mode 102 after only being in the diesel combustion mode 100 for a short period of time. In this case the switching must occur. This is due to the fact that PCI combustion may only be operated during low load operating conditions.

Figure 5:
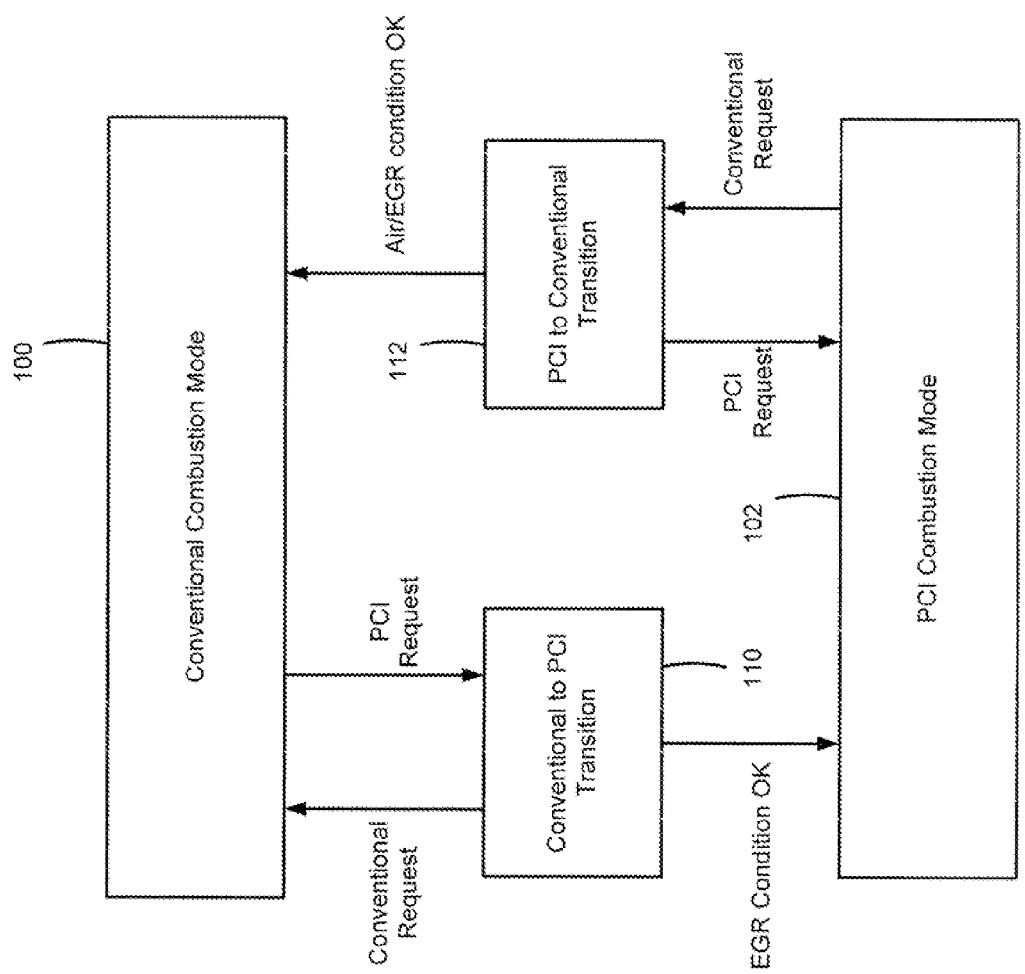
FIG. 5 is a state transition diagram illustrating the coordination of combustion mode switching.

Referring now to FIG. 5, the transition module 52 of FIG. 3 will be discussed in more detail. Because the operating condition requirements for PCI and diesel combustion are very different, it is impractical to switch from one mode to the other immediately after a mode switch request 60 is issued. Therefore, when the mode switch request 60 is submitted to the transition module 52, the transition module 52 will coordinate the combustion mode switching at the right moment and under the appropriate conditions. The transition module 52 includes a Combustion Mode Switching Coordination Subsystem (CMSCS) which performs this functionality.

As shown in the state diagram of FIG. 5, when the CMSCS receives a switch request 60 to switch to a different combustion mode, the mode will first be set to a transitional mode. The transitional mode can be at least one of a diesel combustion to PCI transition mode 110 and a PCI to diesel combustion transition mode 112. For example, if the initial mode is the diesel combustion mode 100, after receiving a switch request 60 to switch to the PCI mode 102, the CMSCS will switch the mode to the diesel combustion to PCI transition mode 110. While in this mode, the CMSCS will check the air/EGR condition received from the air/EGR estimation module 54 of FIG. 3. If the air/EGR condition indicates EGR is sufficient, the CMSCS switches the mode to the PCI mode 102. Otherwise, if a switch request to switch back to the diesel combustion mode 100 is received before the air/EGR condition 78 indicates the EGR is ready, the CMSCS switches the mode back to the diesel combustion mode 100. This strategy guarantees that the desired combustion mode is entered only when appropriate conditions such as air and EGR percentages are achieved.

Similarly, if the initial mode is the PCI mode 102, after receiving a switch request 60 to switch to the diesel combustion mode 100, the CMSCS will switch the mode to the PCI to diesel combustion transition mode 112. While in this mode, the CMSCS will check the air/EGR condition received from the air/EGR estimation module 54 of FIG. 3. If the air/EGR condition indicates the air/EGR is sufficient, the CMSCS will switch the mode to the diesel combustion mode 100. Otherwise, if a switch request 60 to switch back to the PCI mode 102 is received before the air/EGR condition 78 indicates the air/EGR is ready, the CMSCS will switch the mode back to the PCI mode 102.

Figure 6:
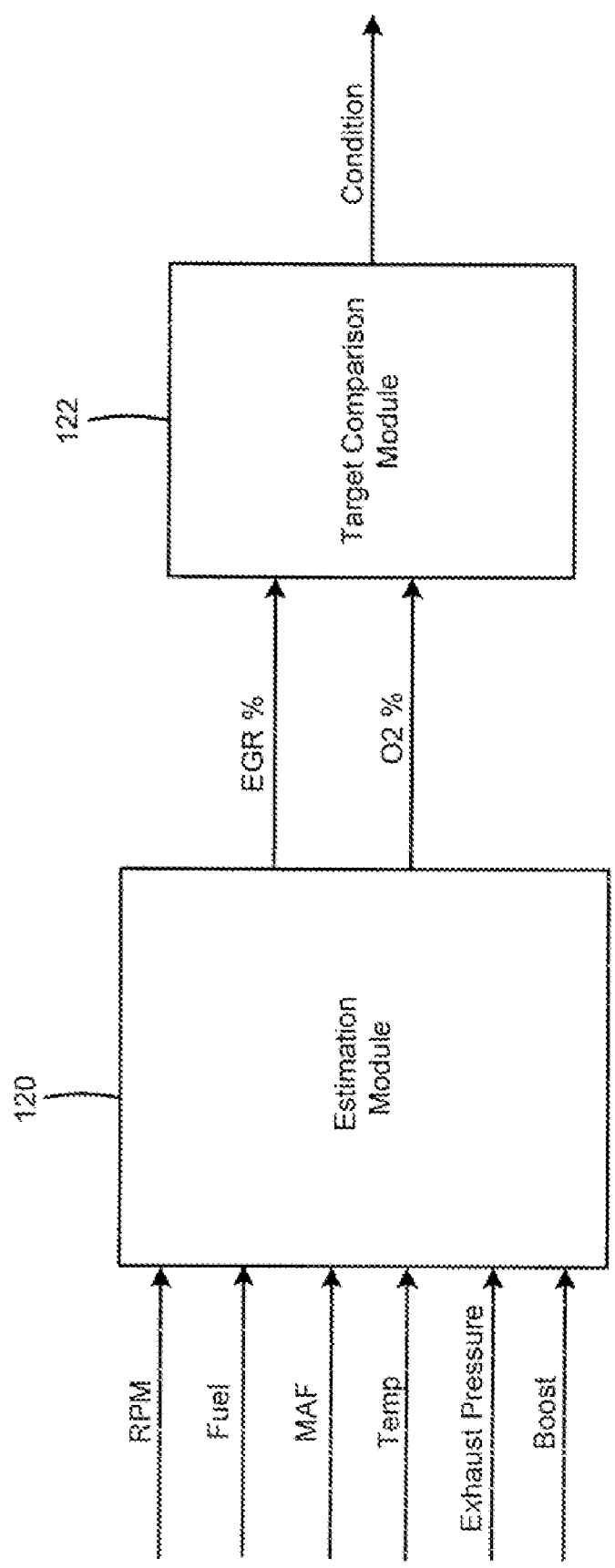
FIG. 6 illustrates an exhaust gas recirculation control model.

Referring now to FIG. 6, the air/EGR estimation module 54 of FIG. 3 will be discussed in more detail. This subsystem includes a real time predictive estimation sub-module 120 and a target comparison sub-module. The estimation sub-module 120 estimates a percentage of EGR and a percentage of oxygen in the intake manifold based on various measurement parameters such as engine speed, mass airflow, fuel quantity, boost pressure, intake temperature, and exhaust pressure. The target comparison sub-module 122 computes a target value and compares the estimated EGR and oxygen percentages to the target value to determine if the air/EGR requirements for PCI or diesel combustion are met. An air/EGR condition is set based on whether the requirements are met. The air/EGR condition is output to the transition module 52 of FIG. 3 to determine the appropriate combustion mode to command for the engine.

Figure 7:
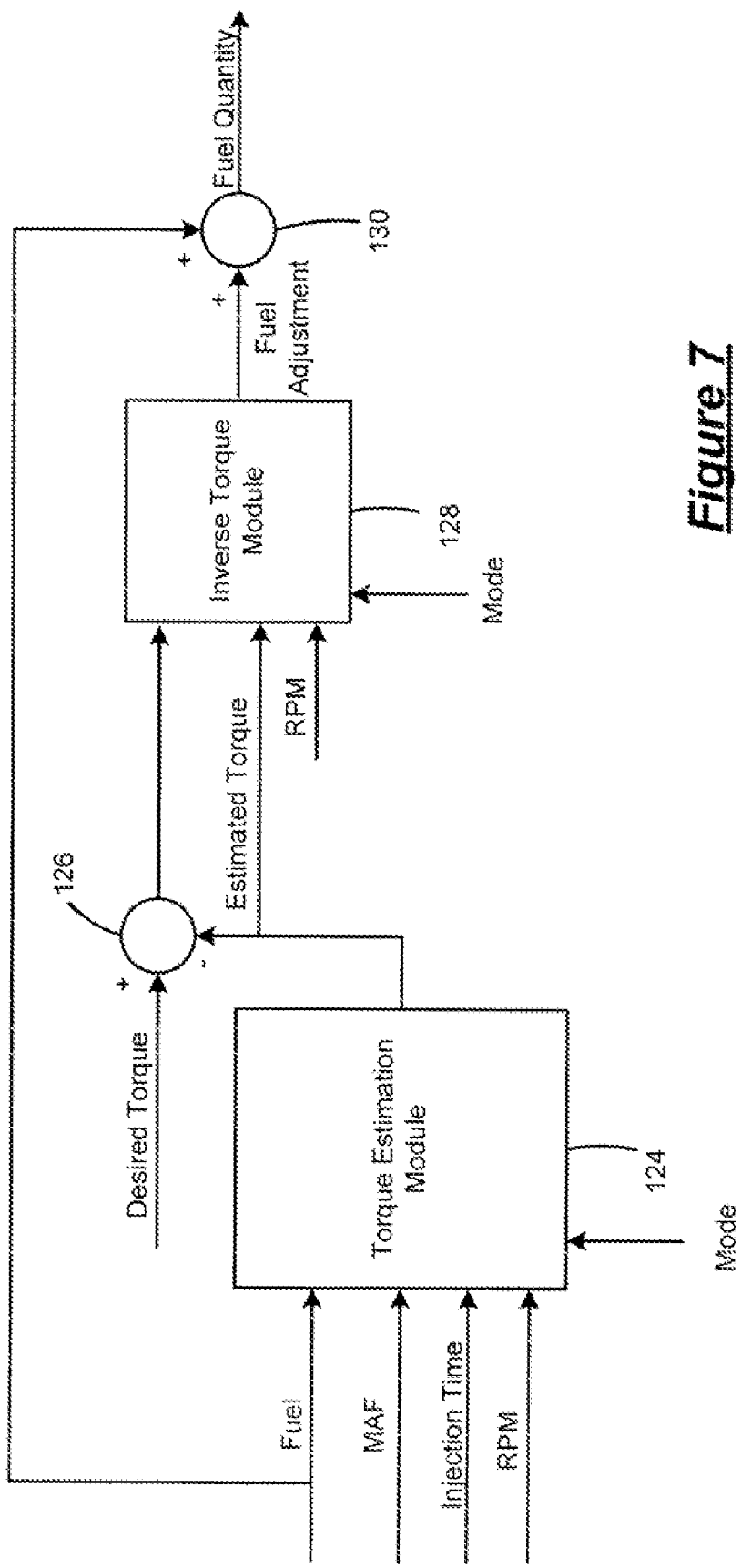
FIG. 7 is illustrates a torque control model.

Referring now to FIG. 7, the air/fuel control module 56 of FIG. 3 will be discussed in more detail. This subsystem controls air and fuel to the cylinder to achieve smooth transitions during combustion mode switching. The air/fuel control module 56 determines target values for mass airflow, fuel injection quantity, and fuel injection timing based on the mode determined by the transition module 52 of FIG. 3. During the PCI mode and the diesel combustion mode, the mass airflow, the fuel injection quantity, and the fuel injection timing is determined based on the engine speed and fuel quantity (or torque). In an exemplary embodiment separate mass airflow, fuel injection quantity, and fuel injection timing lookup tables are implemented for each mode. The lookup tables may be implemented as two-dimensional tables with engine speed and fuel quantity (or torque) as the indices.

During the transition modes, the mass airflow target and the desired fuel injection timing are determined based on the engine speed and the fuel quantity (or torque). In an exemplary embodiment separate mass airflow and fuel injection timing lookup tables are implemented for each transition mode. The lookup tables may be implemented as two-dimensional tables with engine speed and fuel quantity (or torque) as the indices. However, the torque control subsystem shown in FIG. 7 is adopted to adjust the fuel injection quantity during the transition modes so that the desired torque is maintained and a smooth transition between combustion modes is achieved.

In FIG. 7, a torque estimation sub-module 124 determines an estimated torque based on the combustion mode, fuel quantity, mass airflow, injection time, and engine speed. The estimated torque is subtracted from a determined desired torque at 126. An inverse torque sub-module 128 determines a fuel adjustment value based on the difference in torque and other engine operating parameters such as engine speed, estimated torque, and combustion mode. The fuel adjustment value is then added to the actual fuel quantity at 130 and output as a desired fuel quantity. The desired fuel quantity is then used to control fuel to the cylinder.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A combustion mode switching control system for diesel engines, comprising:
    a switch determination module that initiates a switch request to switch between at least one of a premixed compression ignition (PCI) mode and a diesel combustion mode based on engine speed and at least one of fuel quantity and torque;
    a transition module that commands the at least one of the PCI mode and the diesel combustion mode based on the switch request;
    a control module that controls at least one of target airflow, desired fuel quantity, and desired fuel injection timing based on the command; and
    an air estimation module that determines a current status of air flowing into the engine and wherein the transition module commands the at least one of the PCI mode and the diesel combustion mode based on the status.

2. The system of claim 1 wherein the air estimation module determines the current status of the airflow based on whether a percentage of air flowing from exhaust gas recirculation (EGR) is sufficient to allow a switch to occur.

3. The system of claim 1 wherein the air estimation module determines the current status of the airflow based on at least one of fuel quantity, torque, engine speed, mass airflow, boost pressure in the intake manifold, temperature in the intake manifold, and exhaust pressure.

4. The system of claim 1 wherein the transition module commands at least one of a diesel combustion to PCI transition mode and a PCI to diesel combustion transition mode after receiving the switch request and until at least one of the status indicates that the airflow is sufficient to accommodate the switch request and a subsequent switch request is received indicating to switch back to a previous mode.

5. The system of claim 1 wherein the control module controls target airflow, desired fuel injection quantity, and desired fuel injection timing based on the mode, engine speed, and at least one of actual fuel injection quantity and torque.

6. The system of claim 5 wherein the control module controls target airflow, desired fuel injection quantity, and desired fuel injection timing during the PCI mode and the diesel combustion mode based on separate target airflow, desired fuel injection quantity, and desired fuel injection timing lookup tables for each of the PCI mode and the diesel combustion mode, and wherein the lookup tables are indexed by engine speed and at least one of actual fuel injection quantity and torque.

7. The system of claim 4 wherein the control module controls target airflow and fuel injection timing during the diesel combustion to PCI transition mode and the PCI to diesel combustion transition mode based on separate target airflow and fuel injection timing lookup tables for each of the diesel combustion to PCI transition mode and the PCI to diesel combustion transition mode, and wherein the lookup tables are indexed by engine speed and at least one of actual fuel injection quantity and torque.

8. The system of claim 4 wherein the control module controls the desired fuel quantity during the diesel combustion to PCI transition mode and the PCI to diesel combustion transition mode based on desired torque, actual fuel quantity, engine speed, mass airflow, and injection timing.

9. The system of claim 4 wherein the control module controls the target airflow, desired fuel injection quantity, and desired fuel injection timing during the diesel combustion to PCI transition mode and the PCI to diesel combustion transition mode based on at least one of a separate target airflow, desired fuel injection quantity, and desired fuel injection timing lookup tables for each of the diesel combustion to PCI transition mode and the PCI to diesel combustion transition mode, and wherein the lookup tables are indexed by engine speed and at least one of actual fuel injection quantity and torque.

10. The system of claim 4 wherein the control module controls the target airflow, desired fuel injection quantity, and desired fuel injection timing during the diesel combustion to PCI transition mode and the PCI to diesel combustion transition mode based on desired torque, actual fuel quantity, engine speed, mass airflow, and injection timing.

11. A method of switching between a premixed compression ignition mode (PCI) and a diesel combustion mode for diesel engines, comprising;
    initiating a switch request to switch between at least one of a premixed compression ignition (PCI) mode and a diesel combustion mode based on engine speed and at least one of fuel quantity and torque;
    determining an airflow status based on airflow operating conditions of the engine;
    commanding at least one of the PCI mode and the diesel combustion mode based on the switch request and the airflow status; and
    controlling at least one of target airflow, desired fuel quantity, and desired fuel injection timing based on the commanded mode.

12. The method of claim 11 comprising commanding at least one of a diesel combustion to PCI transition mode and a PCI to diesel combustion transition mode after initiating the switch request.

13. The method of claim 11 comprising:
    determining the target airflow based on the mode, engine speed, and at least one of actual fuel quantity and torque; and
    determining the fuel injection timing based on the mode, engine speed, and at least one of actual fuel quantity and torque.

14. The method of claim 12 comprising determining the desired fuel quantity based on desired torque, engine speed, mass airflow, injection timing, and at least one of actual fuel quantity and torque when the mode is commanded to the diesel combustion to PCI transition mode and the PCI to diesel combustion transition mode.

15. The method of claim 12 comprising determining the desired fuel quantity during the diesel combustion to PCI transition mode and the PCI to diesel combustion transition mode, wherein the determining comprises:
    estimating a torque value based on the current combustion mode, actual fuel quantity, mass airflow, injection time, and engine speed;
    determining a difference between the estimated torque and a desired torque;
    determining a fuel adjustment value based on the difference and engine operation parameters; and
    adding the fuel adjustment value to the actual fuel quantity to achieve the desired fuel quantity.

16. The method of claim 11, the determining the airflow status is further based on at least one of engine speed, fuel quantity, torque, mass airflow, boost pressure in an intake manifold of the engine, temperature in the intake manifold, and exhaust pressure.

17. The method of claim 11, the determining of airflow status comprising:
- estimating a percentage of exhaust gas recirculation (EGR) flowing into an intake manifold of the diesel engine;
- estimating a percentage of oxygen in the intake manifold;
- computing a target exhaust gas recirculation level for the intake manifold;
- computing a target of oxygen level for the intake manifold; and
- setting the airflow status based on a comparison of the estimated percentage of EGR and the target EGR and a comparison of the estimated percentage of oxygen and the target oxygen.

18. The method of claim 11 comprising:
- determining the target airflow based on the mode, engine speed, and at least one of actual fuel quantity and torque; and
- determining the desired fuel quantity based on the mode, engine speed, and at least one of actual fuel quantity and torque.

19. The method of claim 11 comprising:
- determining the desired fuel quantity based on the mode, engine speed, and at least one of actual fuel quantity and torque; and
- determining the desired fuel injection timing based on the mode, engine speed, and at least one of actual fuel quantity and torque.

* * * * *